United States Patent [19]

Zillman

[11] 4,072,780
[45] Feb. 7, 1978

[54] PROCESS FOR MAKING ELECTRICAL COMPONENTS HAVING DIELECTRIC LAYERS COMPRISING PARTICLES OF A LEAD OXIDE-GERMANIUM DIOXIDE-SILICON DIOXIDE GLASS AND A RESIN BINDER THEREFORE

[75] Inventor: Jack H. Zillman, San Juan Capistrano, Calif.

[73] Assignee: Varadyne Industries, Inc., Santa Monica, Calif.

[21] Appl. No.: 736,486

[22] Filed: Oct. 28, 1976

[51] Int. Cl.$^2$ .................... B32B 5/16; B32B 31/04; B32B 31/18
[52] U.S. Cl. ...................... 428/325; 156/240; 156/250; 156/264; 252/63.5; 361/321; 428/434; 428/457; 428/463; 428/901
[58] Field of Search ........ 174/137 B, 110 A, 110 SR, 174/113 C, 116, 118, 68.5; 29/624, 625; 428/901, 434, 469, 457, 325; 156/246, 264, 250; 361/402, 411, 321; 252/63.5

[56] References Cited

U.S. PATENT DOCUMENTS

| | | | |
|---|---|---|---|
| 3,765,082 | 10/1973 | Zyetz | 29/625 |
| 3,775,844 | 12/1973 | Parks | 29/624 |
| 3,837,869 | 9/1974 | Bacher et al. | 252/63.5 |
| 3,852,077 | 12/1974 | Rapp | 252/63.5 |
| 3,935,019 | 1/1976 | Rapp | 252/63.5 |

FOREIGN PATENT DOCUMENTS

| | | | |
|---|---|---|---|
| 715,475 | 9/1954 | United Kingdom | 428/901 |

OTHER PUBLICATIONS

Chem. Abstracts, 75-79810u.
Topping et al., J. Amer. Ceram. Soc., 57[5], 205–208, 209–212, (1974).
Topping et al., J. Amer. Ceram. Soc., 57[c], 281–282, (1974).

*Primary Examiner*—J.C. Cannon
*Attorney, Agent, or Firm*—Keith D. Beecher

[57] ABSTRACT

A process for making electronic filter circuit components is provided which comprises forming a flat electrically conductive layer on a wafer formed of ceramic, or of other appropriate dielectric material, the conductor being shaped to provide a portion of an inductive coil, or a capacitive element. The process of the invention assures relatively low resistance in the conductive layers so as to provide a filter circuit of a relatively high quality factor (Q), when a plurality of such wafers are stacked and appropriately interconnected.

4 Claims, No Drawings

PROCESS FOR MAKING ELECTRICAL COMPONENTS HAVING DIELECTRIC LAYERS COMPRISING PARTICLES OF A LEAD OXIDE-GERMANIUM DIOXIDE-SILICON DIOXIDE GLASS AND A RESIN BINDER THEREFORE

BACKGROUND OF THE INVENTION

Copending Application Ser. No. 620,968, filed Oct. 9, 1975 in the name of the present inventor and now abandoned, describes an electrical component which functions as an inductive/capacitive network for use as a transformer, filter, or the like. The electrical component described in the copending application comprises a stack of wafers formed of ceramic, or other appropriate dielectric material, each wafer having a flat electrically conductive layer thereon shaped to provide a portion of an inductive turn, or a capacitive element. Interconnecting holes are provided through the wafers and through the conductive layers to establish electrical connections with the individual conductive layers.

The electrical component described in the copending application overcomes serious limitations in the prior art use of the discrete elements for forming filters, and the like, by providing an integrated capacitive-inductive network which is conveniently packaged as a single component, yet which operates effectively as a high resolution wave filter having as large a number of inductive-capacitive sections as desired.

Difficulties have been countered, however, in reducing the resistance of the conductive layers on the individual wafers sufficiently so that the resulting filter has a high quality factor (Q) required for effective filter use. A primary objective of the present invention is to provide a process for the fabrication of the individual wafer elements, whereby a low resistance is achieved, for resulting high quality factor (Q) in the ultimate filter circuit formed when the individual wafers are stacked and interconnected with one another.

DETAILED DESCRIPTION OF THE PRESENTLY PREFERRED EMBODIMENT OF THE PROCESS

Step 1: Lead oxide, germanium dioxide and silica dioxide are obtained in powdered form, and are mixed together in the following proportions by weight:

| | |
|---|---|
| Lead oxide | 82% |
| Germanium dioxide | 11% |
| Silica | 7% |

The silica is used to reduce the quantity of high cost germanium dioxide required in the mixture. The mixture is then placed in a furnace for approximately one-half hour at 800° C in which it assumes a molten state. It is then poured out on a plate, forming a sheet.

Step 2: The sheets are returned to the furnace for approximately half an hour, and are annealed at 300° C.

Step 3: The sheets are then removed from the furnace and powdered into coarse granular form of approximately 10–30 mils.

Step 4: The powder is placed in a ball mill for approximately six hours to be further powdered to as fine as a consistency as possible. This results in a lead-germinate-silica (LGS) glass powder.

Step 5: The (LGS) glass powder is then mixed in the ball mill for approximately six hours with an appropriate binder system in the proportions of 90% glass powder and 10% binder system. The binder system may consist of the following components:

B72 Acryloid (Rohm and Hass - Philadelphia, Penna.) —65.7% by weight

A-11 Acryloid (Rohm and Haas - Philadelphia, Penna.) —12.8% by weight

Santicizer - 160 (Monsanto, St. Louis, Missouri) —21.5% by weight

The components of the binder system are mixed with a solvent, such as ethylene dichloride (EDC) in a proportion of approximately 4:1.

Step 6: The resulting slurry is cast on a glass strip, or similar surface, into a tape of 1–3 mils (average 2 mils) thickness, using a doctor blade, or the like.

Step 7: The tape is then dried at room temperature for approximately half an hour, and it is then stripped from the glass. After twenty-four hours, it is then die cut into wafers.

Step 8: The conductive element is then screened onto the individual wafers in selected patterns using silver ink (60% silver and 40% binder). Such ink may be obtained from U.S. Electronics, Inc. of Tucson, Arizona (Product 203-1175).

Step 9: The wafers with the conductive layers are then pressed together and laminated in an appropriate laminating die.

Step 10: The resulting laminations are then placed in an oven at 135° F for approximately two hours to dry and to become adhesively attached to one another.

Step 11: The laminations are then removed from the oven and diced into the filter component.

Step 12: The diced laminations are then placed in a drying oven of 650° F for approximately 48 hours.

Step 13: The diced laminations are then placed in a furnace at 400° C for approximately two hours, after which the temperature in the furnace is raised to 450° C for another two hours, so as to achieve a desired degree of crystallization in the wafers.

Step 14: As a final step in the process, the leads are soldered to the terminals of the conductive layers.

The process described above provides a tape and a conductive layer which are compatible with one another, and in which there is no tendency for the conductive layer to attack or warp the tape. Also, the process provieds a conductive layer having a sheet resistivity of the order of 0.003 ohms per square, as compared with sheet resistivities of the order of .115 ohms per square in the prior art. Filter circuits using components formed by the process of the present invention have been constructed to have quality factors (Q) of the order of 150. For most purposes, such filter circuits must have a quality factor (Q) of at least 60, and such quality factors could not be achieved by components constructed by prior art process in which the quality factors ranged around 5.

The invention provides, therefore, a process for fabricating electrical components formed of stacks of laminated dielectric wafers with conductive layers thereon, the filter networks having desired high quality factors (Q) for use in present day electronic circuits.

It is to be understood that while one embodiment of the product and process of the invention has been described, modifications may be made, and it is intended in the claims to cover the modifications which come within the true spirit and scope of the invention.

I claim:

1. An electrical component comprising a stack of flat planar dielectric wafers, each of said wafers having an electrically conductive layer thereon, said wafers being composed of minute particles of glass formed of silicon dioxide, lead oxide and germanium dioxide, in substantially the following proportions by weight: lead oxide (82%), germanium dioxide (11%) and silicon dioxide (7%), and an organic polymeric binder for said particles, and said conductive layer being formed of silver.

2. A process for making an electrical component in the form of a stack of flat planar dielectric wafers, each of said wafers having an electrically conductive layer thereon, said process including the following steps: intermixing lead oxide and germanium dioxide and silicon dioxide in powdered form and in substantially the following proportions by weight: lead oxide (82%), germanium dioxide (11%) and silicon dioxide (7%) and forming minute glass particles from the resulting composition, intermixing the glass particles with an organic polymeric binder, casting the resultant composition into a tape, cutting the tape to form the dielectric wafers, and forming a pattern of silver on each of the dielectric wafers to constitute the electrically conductive layer.

3. The process defined in claim 2, and which includes the steps of pressing the wafers together as a laminated stack.

4. The process defined in claim 3, and which includes the step of dicing the laminated stack to form the electrical component.

* * * * *